Aug. 2, 1932.   E. J. VON PEIN   1,869,873
CASH REGISTER
Filed April 4, 1921   6 Sheets-Sheet 1
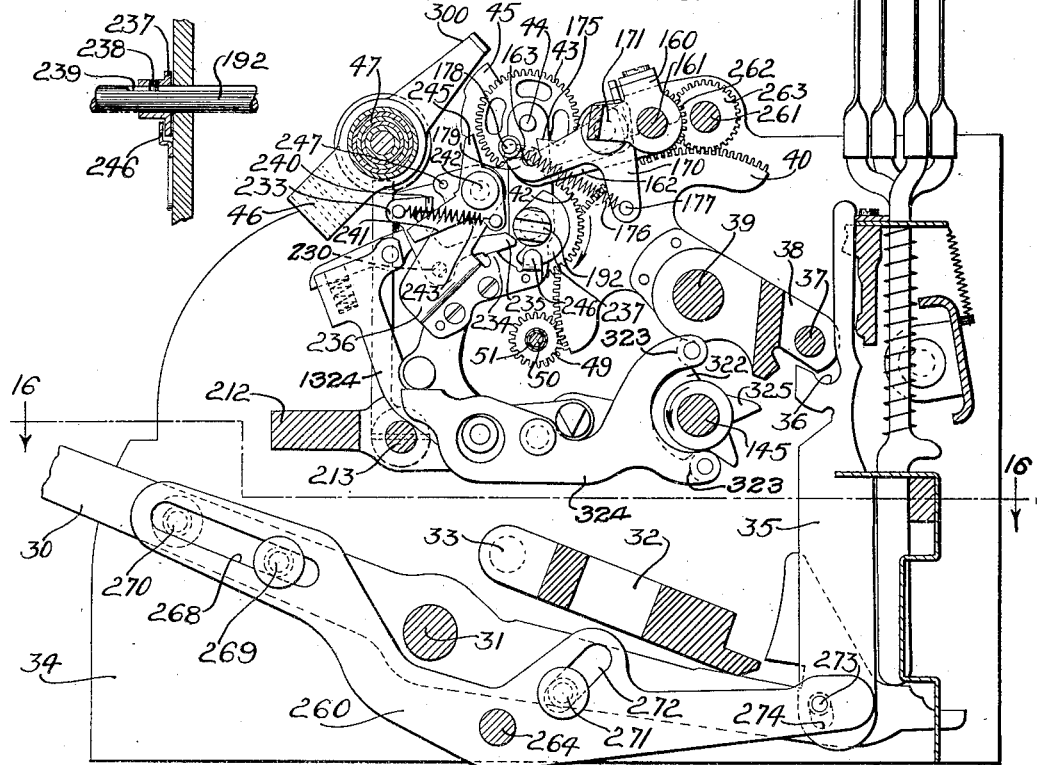

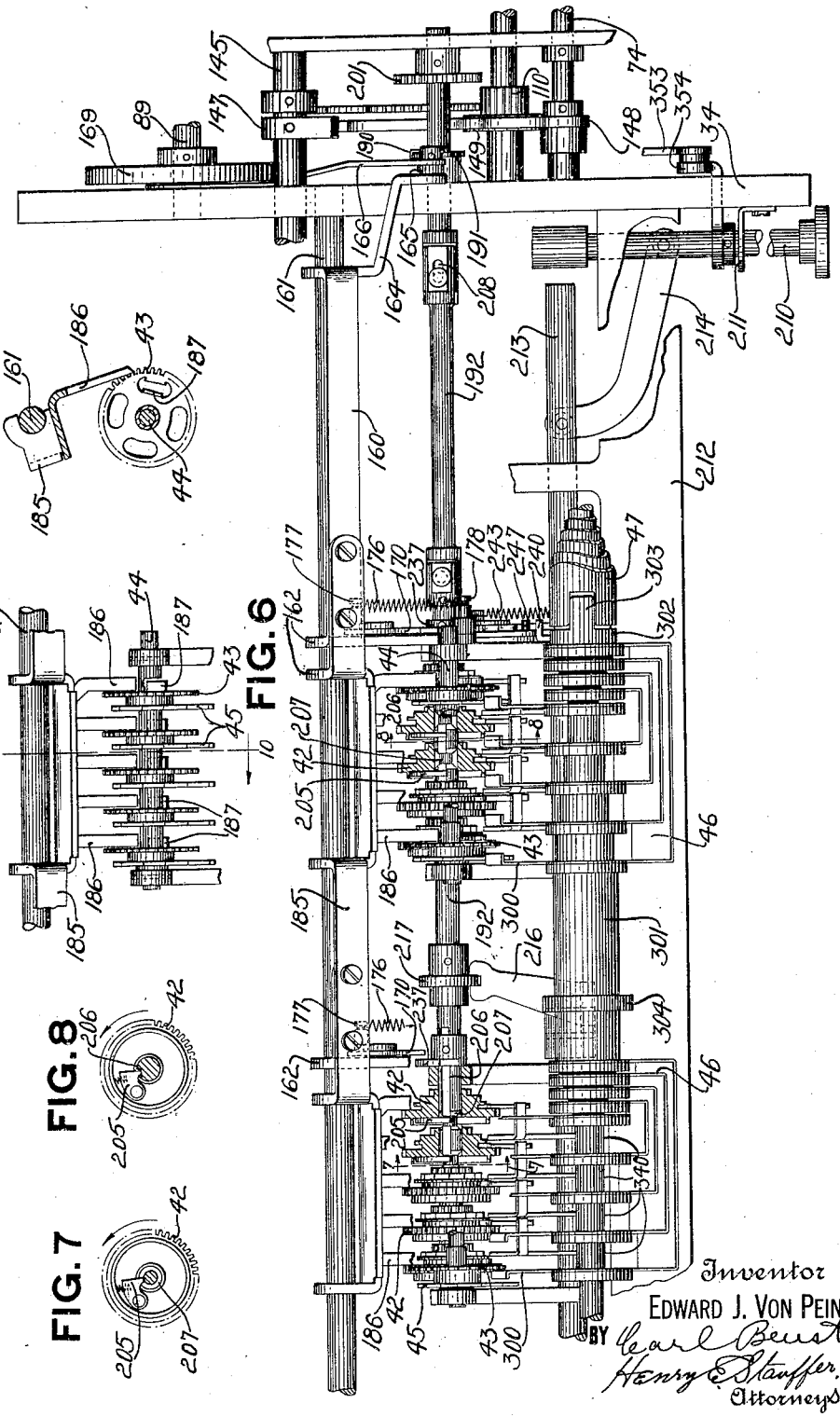

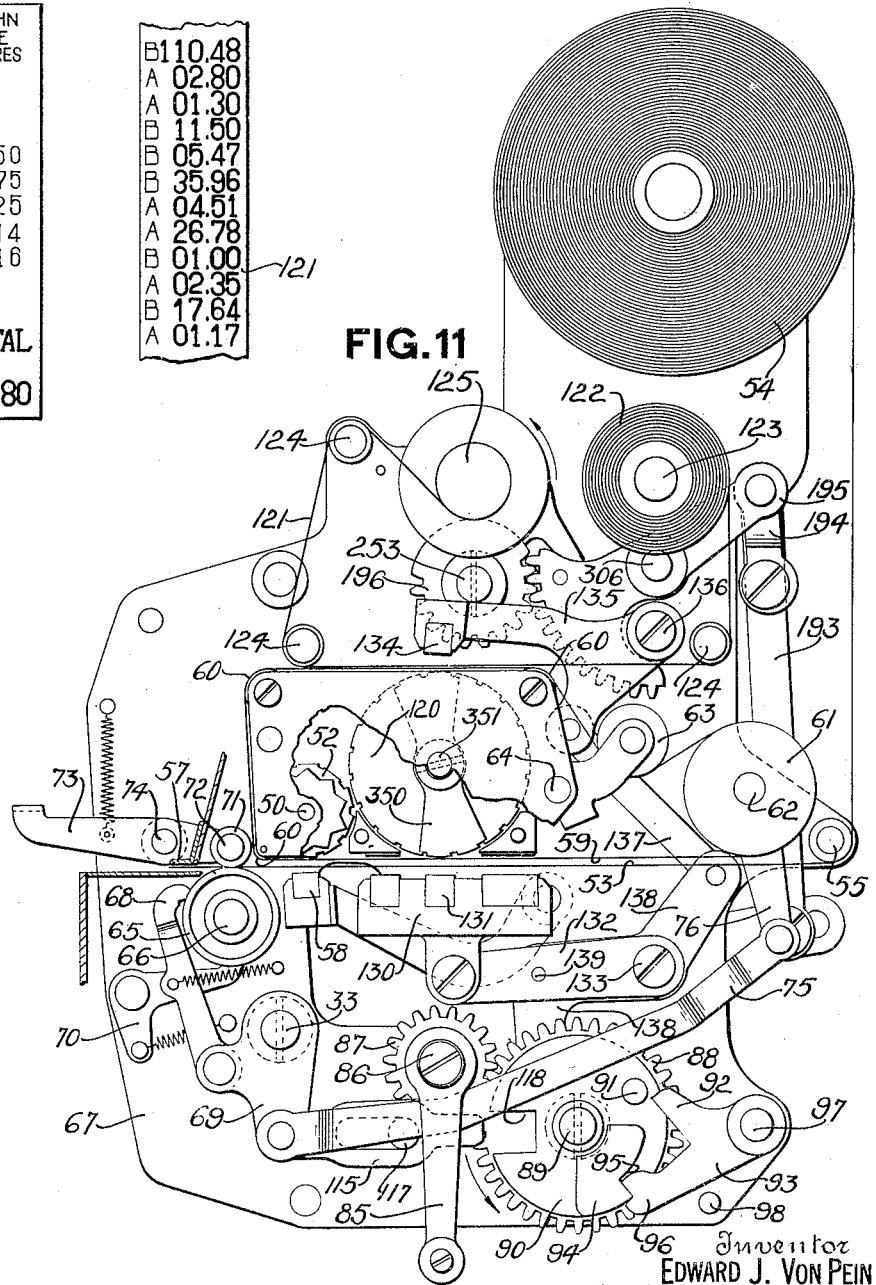

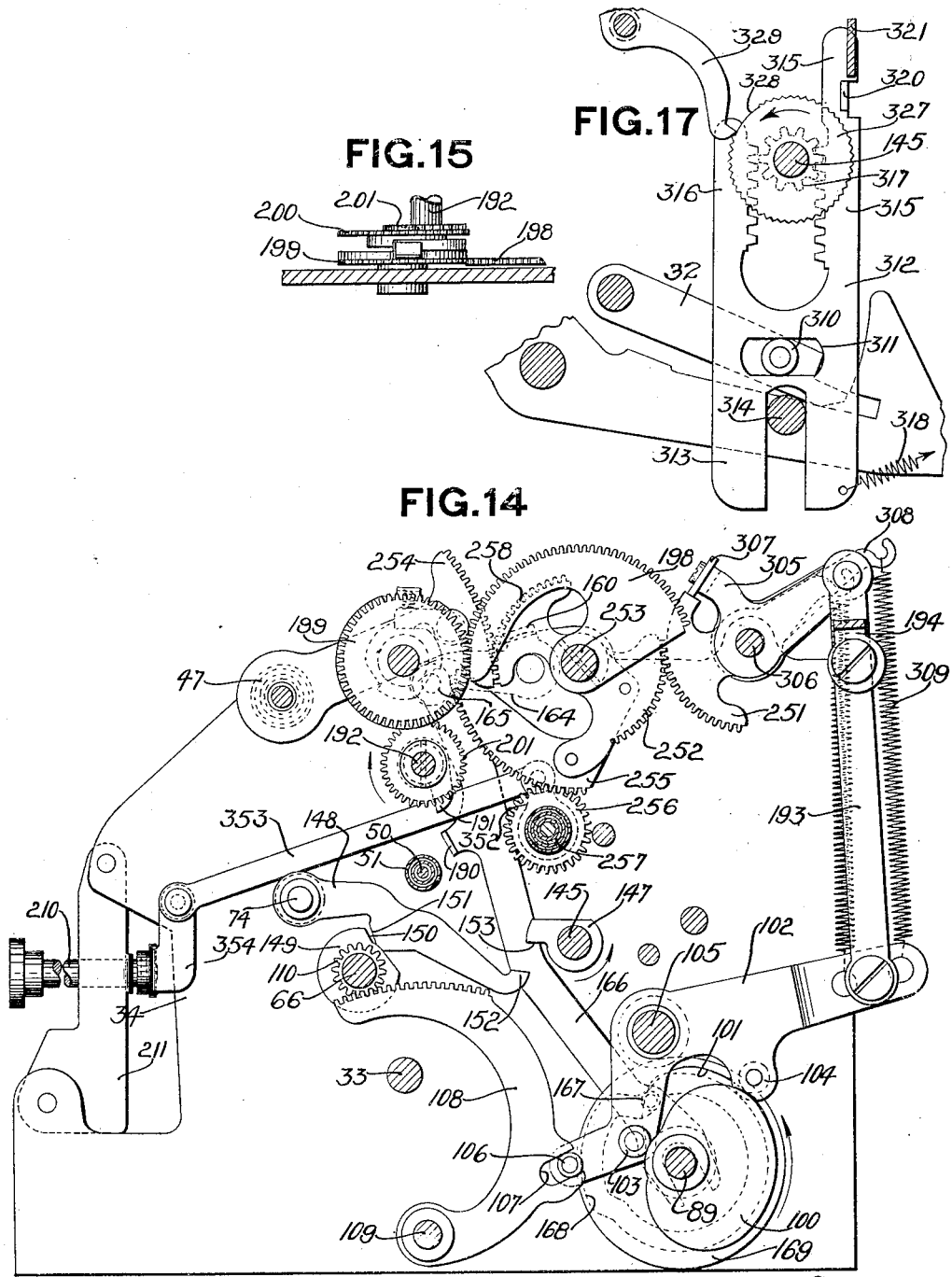

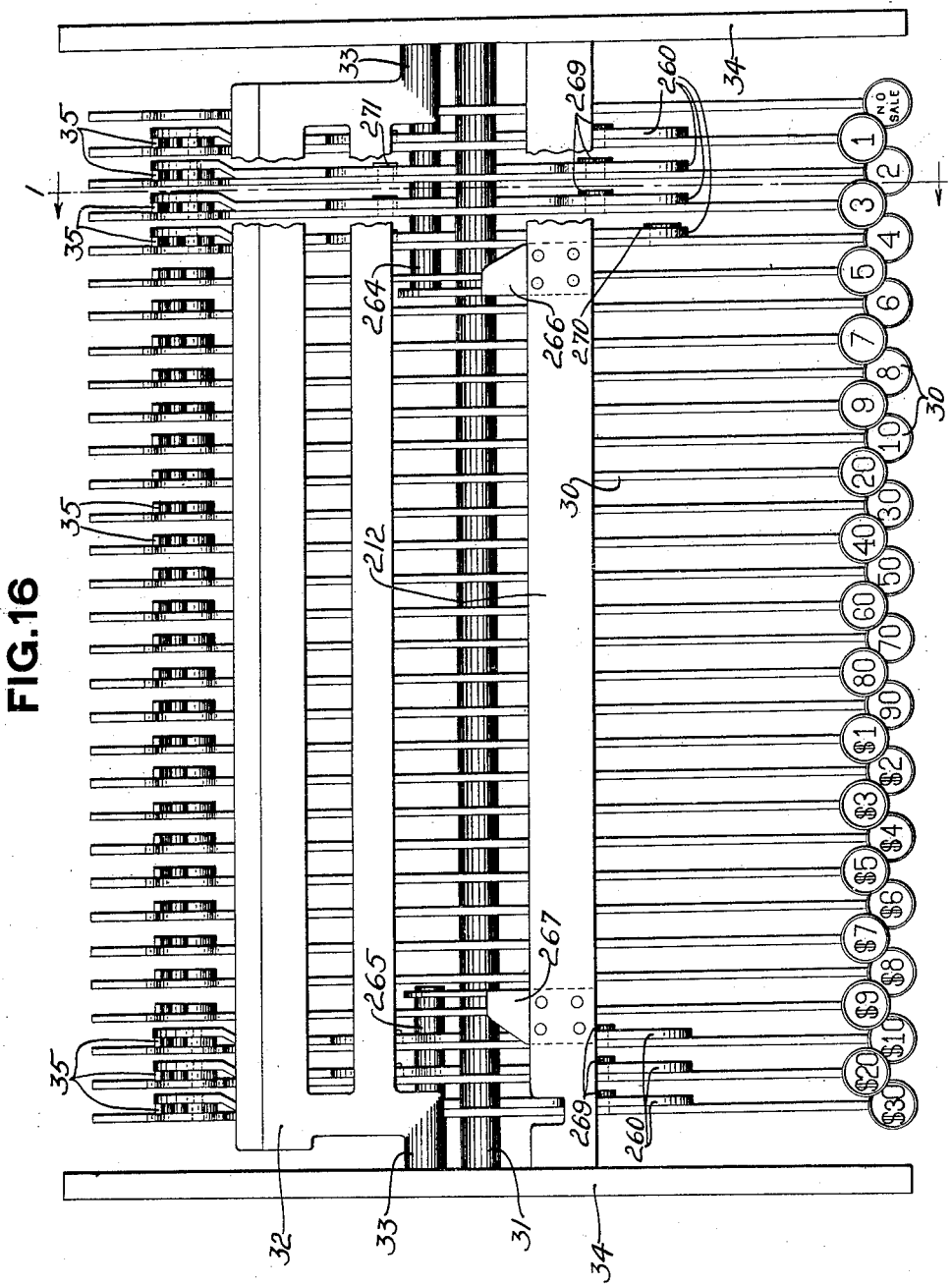

Aug. 2, 1932.  E. J. VON PEIN  1,869,873
CASH REGISTER
Filed April 4, 1921   6 Sheets-Sheet 6
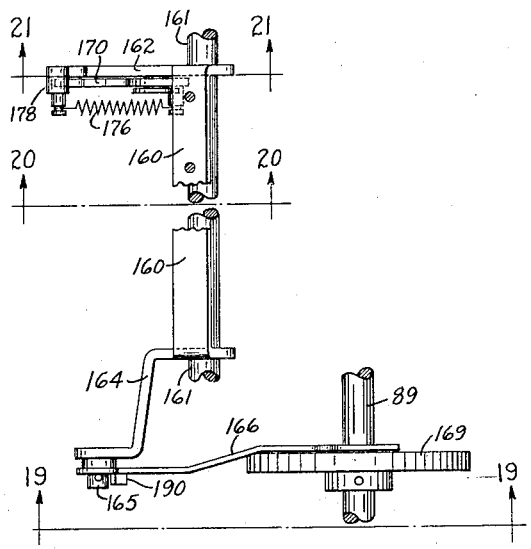
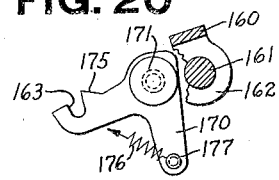
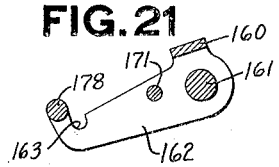
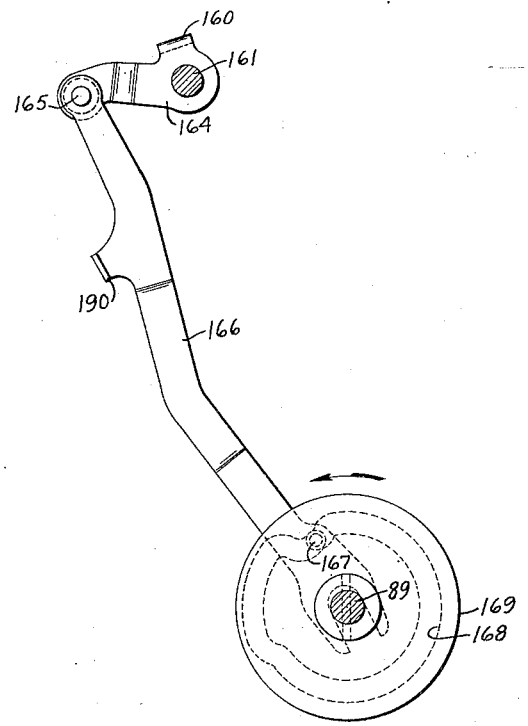
Inventor
Edward J. Von Pein
By Carl Beust
Ralph L. Warfield
His Attorneys Patented Aug. 2, 1932

1,869,873

UNITED STATES PATENT OFFICE

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 4, 1921. Serial No. 458,509.

This invention relates to accounting machines and has more particular relation to the type of machine illustrated in Letters Patent of the United States numbered 718,565 and 773,060 granted to Joseph P. Cleal, and in applicant's application for Letters Patent of the United States, Serial No. 293,141, filed April 28, 1919, and Patent No. 1,555,534, issued to applicant.

Accounting machines of this type are generally provided with one or more totalizers with suitable key controlled mechanism for entering items in one or more of the same. Indicators are usually provided for publicly indicating each item as it is entered, as well as printing mechanism for making printed records in various forms of the transactions handled by the machine.

The invention contemplates the provision of suitable devices and mechanisms to insure the proper operation of the machine in the performance of its functions, as well as to facilitate the entering and recording of items and totals.

With these and incidental objects in view, the invention consists in certain novel features of construction and combinations of parts, the essential elements of which are set forth in appended claims, and a preferred form of embodiment of which is hereinafter described with reference to the drawings which accompany and form a part of this specification.

Of said drawings:

Fig. 1 is a transverse section of the machine taken on the line 1—1 of Fig. 16 and includes the right hand totalizing mechanism and the item indicators.

Fig. 2 is a detail view of the totalizer partly in section.

Fig. 3 is a detail view in section of the transfer pawl lifting arm cam.

Fig. 4 is a front elevation of the totalizer selecting arm and cooperating mechanism.

Fig. 5 is a side elevation of the arm and mechanism shown in Fig. 4.

Fig. 6 is a detail plan view of the totalizer selecting mechanism, the turn-to-zero stopping device and operating mechanism interlocking device.

Fig. 7 is a detail view of a totalizer wheel taken on the line 7—7 of Fig. 6.

Fig. 8 is a detail view of a totalizer wheel taken on the line 8—8 of Fig. 6.

Fig. 9 is a detail view of the totalizer showing the turn-to-zero stopping device.

Fig. 10 is a section taken on the line 10—10 of Fig. 9.

Fig. 11 is a side elevation of the printing mechanism.

Fig. 12 is a detail view of an itemized receipt issued by the machine.

Fig. 13 represents a portion of the record strip printed by the printing mechanism shown in Fig. 11.

Fig. 14 is a transverse section through the printer, showing the printing wheel actuating mechanism, the totalizer turn-to-zero mechanism and operating mechanism interlocking device.

Fig. 15 is a detail view of part of the totalizer turn-to-zero mechanism.

Fig. 16 is a sectional plan view of the machine on the line 16—16 of Fig. 1.

Fig. 17 is a side view of the driving connection between the key coupler and main shaft.

Fig. 18 is a fragmentary plan view of the device for holding the totalizers out of engagement from the actuators when operating the total printing mechanism.

Fig. 19 is a side elevation of Fig. 18 on line 19—19 thereof.

Fig. 20 is a section on line 20—20 of Fig. 18, looking in the direction of the arrows.

Fig. 21 is a section on line 21—21 of Fig. 18, looking in the direction of the arrows.

Described in general terms, the machine comprises a series of manipulative devices, such as keys which operate mechanism for indicating the items, entering the items on an issued receipt or other record and also operate one or more totalizers. These keys impart individual characteristic movement to actuating devices, which, in turn, actuate the elements of the totalizers in accordance with the values of the operated keys, and also set up type carriers from which an impression is taken upon an issuing receipt.

The machine is provided with two totalizers, which are here disclosed in a general way.

Printing mechanism is also provided for selectively recording amounts accumulated in the totalizers on an issued receipt and on a record strip retained in the machine.

A general description of the type of machine to which the present improvements are shown as applied will be given. For a more detailed description reference may be had to the hereinbefore mentioned patents and application.

Keys 30 (Fig. 1) are pivoted upon a transverse rod 31, and when the forward ends of one or more keys are depressed they engage and rock a key coupler 32, having trunnions 33 seated in bearings in the side frames 34. Operatively connected to each key 30 is a differential arm 35, each formed with a slot 36 adapted, when a key 30 is operated, to engage a transverse rod 37 on a registering frame 38 pivoted on a rod 39, to rock said frame different distances, according to the value of the key 30 depressed. The slots 36 are located varying distances from the pivotal points of the arms 35, thereby effecting the differential rocking of the frames 38.

There is a frame 38 for each denominational group of keys 30, but only one is here disclosed. Each frame has attached to it a registering segment 40 (Fig. 1). Two sets of segments 40 are provided, one set for each of the two totalizers, each segment of one set being connected to the one of corresponding numerical order of the other set, so that the pairs of segments move as units.

The totalizers are of the usual form; only one is here shown in elevation, two being shown in plan partly sectioned (Fig. 6). The totalizers are each mounted on a pivoted frame 41 (Figs. 1 and 2) and comprise a plurality of gears 42 mounted on a shaft 192, each gear appropriate to a numerical order as is usual in these devices. Each of the lower order totalizer gears 42 carries a pinion 146. When the totalizer frame is rocked the pinions 146 engage the registering segments 40, and upon operation of the keys 30 will be caused to rotate and carry with them the gears 42. The gears 42 mesh with gears 43 rotatable on a shaft 44 mounted in brackets carried by the rocking totalizer frame 41. Fast to and moving with each gear 43 is a stepped scroll disk 45. There are as many gears 43 and disks 45 for each totalizer as there are denominational gears 42 in the totalizer, as fully described in the Von Pein application and Von Pein patent referred to. Any movement of the totalizer gears will be transmitted directly to the disks 45, so that said disks are caused to rotate to positions appropriate to the total of the items entered on the totalizer. Feelers 300 (Fig. 1) rigid with yokes 46 mounted upon telescopic sleeves 47 are, at the proper time, brought into contact with their respective disks 45 at varying radial distances from the center thereof to control the adjustment of printing wheels 120 (Fig. 11), to positions representing the amount accumulated on the totalizer, as fully set forth in detail in the application and patent of Von Pein, referred to.

The totalizers are rocked into and out of engagement with the registering segments 40 by a train of mechanism driven from the key coupler. The key coupler 32 (Fig. 17) is provided with a laterally projecting stud 310 at its right hand end projecting into a transversely elongated opening 311 in a vertically disposed double rack bar 312. The bar 312 is provided with a bifurcated lower end 313 embracing a stud 314 projecting from the frame of the machine. At its upper end said bar is provided with two oppositely facing racks, 315—316, adapted to cooperate alternately with a pinion 317, fast on the shaft 145.

As shown in Fig. 17, a spring 318 normally holds the rack 315 in mesh with the pinion 317, which condition is maintained during the upward movement of the bar 312 by a flange 320 on said bar and a cooperating guide 321 projecting from the frame of the machine. At the limit of the upward movement of the bar 312 a spring drawn camming arm (not shown) cooperates with the end of the rack 316 to throw it into engagement with the pinion, which engagement is maintained during downward movement of said bar by the flange 320 and guide 321. By the mechanism described the shaft 145 is given one complete rotation during each operation of the keys.

The shaft 145 is provided with substantially semicircular cams 322 cooperating with spaced rollers 323 on a bifurcated end of an arm 324 pivoted to the totalizer frame 41. The normal relation of the cams and rollers is shown in Fig. 1, from which it can be seen that a slight movement of the keys will be sufficient to rock the totalizers into engagement with the registering segments.

The carrying pawls 229 (Fig. 2) are pivotally mounted on one end of levers 1324 pivoted on a rod carried by the totalizer frame and provided at their other ends with rollers for cooperation with spirally arranged cams on the shaft 145. Spring drawn pawls 326 lock the levers 1324 in normal inoperative position until released by being engaged by their respective transfer cams 325.

Each of the segments 40 (Fig. 1) for the right hand or "recording" totalizer meshes with a pinion 49. One of these pinions 49 is fast to the left hand end of a shaft 50, while the other pinions are mounted upon the left hand ends of telescopic sleeves 51, which extend to the right, and on their right hand ends carry printing wheels 52 (Fig. 11) for printing the details of a transaction upon a receipt strip 53 (Figs. 11 and 12) which is run from the supply roll 54 around a guide roll 55 to a severing plate 57, passing between the type carriers 52 and a platen 58, so that when the platen is operated (by mechanism not shown or described herein but fully shown and described in the hereinbefore mentioned patents and application), an impression will be made on the strip.

For the purpose of feeding the strip 53, there is provided a feed roller 65 (Fig. 11) fast on a shaft 66, journaled in a printer side frame 67 and side frame 34 and having fastened thereto a ratchet wheel (not shown) engaged by a spring controlled pawl 68 pivoted on an arm 69, said arm being fastened to one of the oscillatory trunnions 33 upon which the key coupler oscillates.

At each operation of a key 30, which imparts an oscillatory motion to the key coupler 32, the pawl 68 will cause the feed roller 65 to rotate in a counter-clockwise direction. A spring controlled retaining pawl 70 prevents retrograde motion of the roller 65. Directly above the feed roller 65 and in contact with the same is a companion roller 71 freely mounted on a stud 72 carried by a lever 73 fast on a shaft 74 loosely mounted in the printer frame 67 and frame 34. The lever 73 is yieldingly held in position by a spring so as to hold the roller 71 in contact with roller 65 and to permit of manual operation to separate the rollers. The strip 53 passing between the rollers 65 and 71 will feed toward the front of the machine a distance equal to the line spacing of the print at each operation of a key 30.

To secure a visible impression a suitable continuous inking ribbon 59 is wound around guide rolls 60 mounted on studs in the printer frame, and over the inking roller 61, mounted upon a stud 62 projecting from the printer frame. This ribbon is held taut by a tension roll 63 carried in a frame, pivoted on a rod 64, supported by the printer frame. The ribbon is fed at each operation of the recording key 30.

The arm 69, which oscillates with the key coupler, is connected by a link 75 to a ribbon feeding lever 76, which carries a spring actuated pawl, not shown here, for effecting rotary motion of the ink roller 61.

The total printing crank 85 (Fig. 11), which primarily serves as an actuator in connection with the printing of the totals, is freely mounted upon a stud 86 supported by the printer frame 67, and is adapted to be given two rotations in a clockwise direction at each operation. The crank 85 is connected with a gear 87, which meshes with a gear 88, fastened on a drive shaft 89.

Secured to the gear 88 (Fig. 11) is a disk 90, carrying a stop plate 94, having a notch 95, which engages an end 96 of a pawl 93 pivoted upon a stud 97 mounted in the frame 67. A slight counter-clockwise movement of the crank 85 will release the pawl 93 and allow it to swing on its pivot 97 in a counter-clockwise direction until it contacts with a pin 98. The driving shaft 89 is then free to make one complete rotation in a counter-clockwise direction, being stopped at the end of one rotation by the pawl 93 which is raised to a position to cause its end 96 to enter the notch 95 in the plate 94 by a pin 91 on the plate 90 engaging an arm 92 of the pawl 93. This means for arresting the shaft 89 at the end of one rotation and releasable by a rearward movement of the operating crank 85 is old in Fig. 1 of Letters Patent of the United States to Thomas Carroll, 934,994, granted Sept. 28, 1909, to which reference may be made for a full disclosure thereof.

To prevent simultaneous manipulation of both the keys 30 and crank 85, means are provided which will lock either element while the other is being manipulated. A slide 115 (Fig. 11) is pivoted to the arm 69, which is fast on the key coupler trunnion 33, as previously described. The slide 115 is slotted to slide on a guide stud 117, mounted in the printer frame 67. The end of the said slide 115 is shaped to enter a slot 118 in the disk 90 when the key coupler is rocked. With every operation of a key 30 to enter an amount, the slide 115 is thrust into the slot 118 of the disk 90, thus preventing movement of the crank 85 while the machine is being used to enter items. On the other hand, when the crank 85 is being operated the slot 118 is moved out of alignment with the slide 115 and if an attempt is then made to operate a key 30 the slide 115 will strike the periphery of the disk 90 and prevent depression of the keys.

The printing mechanism, in general, is that described in detail in the application of Edward J. Von Pein, Serial No. 293,141. It will be but briefly described here.

The items entered by the operation of the keys 30 are simultaneously entered in two totalizers which are only partially shown in Fig. 6, but which are completely illustrated and described in the Von Pein application hereinbefore referred to.

One totalizer may be used to accumulate items for any desired period of time and is generally known as the "grand" totalizer, while the other is for the purpose of accumulating items of a single transaction and is known as the "transaction" totalizer. As it is desired to print not only the total of each transaction which appears on the issued receipt, but also at the end of any given period of time to print the total appearing on the left hand or "grand" totalizer, means are provided whereby the total printing wheels 120 may be adjusted to positions representing the total on either of said totalizers as desired.

As hereinbefore stated, the feelers 300 of the yokes 46 are brought into cooperation with the stepped scroll disks 45 for the purpose of controlling the setting up of totals on the printing wheels 120. The left hand arms of the yokes 46 are extended to form the feelers 300. The right hand ends of the yokes 46 for the left hand or grand totalizer are fast to the sleeves 301, which connect the yokes 46 of the grand totalizer with the yokes 46 of the transaction totalizer, so that the corresponding yokes of each set move in unison. The right hand ends of the yokes 46 of the transaction totalizer are fast to short sleeves 302 which carry the male portions of clutches 303, which male portions cooperate with female portions of the clutch formed in the left hand end of the sleeves 47. The sleeves 47 extend to the right and on their right hand ends carry segments 254 (Fig. 14) meshing with segments 258 pivoted on the shaft 253 supported in the printer frame. The segments 258 are extended and have fast thereto rack segments 255 meshing with gears 256 fast to sleeves 257 which carry the total printing wheels 120. It will thus be seen that when the yokes 46 are adjusted to extents representing the total appearing in either of said totalizers, the printing elements 120 will, through the medium of the above described connections, be adjusted to like positions.

By reference to Fig. 6 it will be noted that the feelers 300 for the "transaction" totalizer are normally in position to cooperate with the stepped scroll disks of that totalizer, while the feelers 300 of the yokes 46 for the "grand" totalizer are normally out of cooperative position with relation to the stepped scroll disks of the "grand" totalizer. When the machine is operated to print a total with the parts in this position, the total appearing on the "transaction" totalizer will be printed.

In order to permit of the printing of the total appearing in the "grand" totalizer, the following means is provided for shifting the positions of the two groups of yokes 46 so as to render ineffective the group appropriate to the "transaction totalizer" while the group appropriate to the "grand" totalizer is rendered effective. This means comprises a key or manipulative device 210 (Figs. 6 and 10) which is slidably mounted in a bracket 211, carried by the frame 34, and a cross bar 212. The key 210 is operatively connected with the sliding rod 213 by a link 214. The rod 213 carries an arm 215 (Figs. 4 and 5) fast thereto and bifurcated at its upper end to straddle a collar 304 fast on the outermost sleeve 301. It will readily be seen that when the key 210 is pushed inwardly the rod 213 will be slid to the left, thereby shifting the sleeves 301 to the left so as to change the relation of the yokes 46 with respect to their respective totalizers.

This mechanism is substantially the same as that shown in the hereinbefore mentioned Von Pein application, No. 293,141, but is repeated here for convenience.

The mechanism for bringing the feelers 300 on the yokes 46 in contact with the stepped scroll disks 45 is under the direct control of the total printing crank 85 and comprises the following:

It will be remembered that the crank 85 is operatively connected to the driving shaft 89 through the medium of the gears 87 and 88 so that the shaft 89 is given a single rotation upon two turns of the crank 85. Fast on the shaft 89 is a pair of cams 100 and 101 (Fig. 14) cooperating through the medium of rolls 103 and 104 with a rocking lever 102 pivotally mounted upon a rod 105 supported in the frames 34 and 67. The lever 102 is operatively connected with a bell crank 305 mounted on a stud 306 supported in the printer frame 67. The bell crank 305 carries a bar 307 which extends across above all of a series of rack segments 251 which are constantly in mesh with rack segments 252 rigid with the hereinbefore mentioned segments 258.

The segments 251 have arms 308 carrying hooks to which the upper ends of springs 309 are connected, the lower ends of the springs being connected to cross rods carried in the lever 102. The springs 309 are constantly tending to rock the segments 251 clockwise about the shaft 306 but are restrained by reason of the contact of the segments 251 with the bar 307. When, however, the shaft 89 is rotated upon operation of the crank 85, the bell crank 305 is rocked through the medium of the lever 102 and link 193 so as to carry the bar 307 away from the segments 251. This permits the springs 309 to act to rock the segments 251 which will follow the bar 307 until the segments 251 are stopped by the feelers 300 on the yokes 46 coming into contact with the stepped scroll disks 45. When the parts are so arrested, it will be seen that the type wheels 120 will have assumed positions representing the total appearing on the totalizer selected for the purpose of printing a total.

The total printing wheels 120 (Fig. 11) are twice the diameter of the item printing wheels 52, and contain two sets of type characters, one set for printing upon the receipt strip and the other for printing upon the record strip 121 (Figs. 11 and 13).

At the proper time, and by the operation of the crank, a platen block 130 will be raised, bringing a platen 131 into contact with the type wheels 120. The platen block 130 (Fig. 11) is pivotally mounted upon an arm 132, pivoted upon the stud 133, which projects from the printer frame 67.

Mechanism is provided for moving the feed roller 65, immediately after an impression of the total has been taken, to feed the issuing receipt strip a distance sufficient to bring the total past the severing means. This mechanism is the same as that of the Von Pein application and patent referred to, and is briefly as follows:

Carried on the lower end of the lever 102 is an anti-friction roller 106, engaging a slot 107 in a segment arm 108 (Fig. 14) pivoted upon a stud 109, mounted in the machine frame 34, and meshing with the pinion 110, fast to an arm, not shown here, which is freely mounted upon the shaft 66 and carries a slip pawl cooperating with a ratchet fast to the feed roller 65. The oscillatory motion of the arm by means of the segment arm 108 and pinion 110 will rotate the feed roller 65, previously described.

The record strip, which receives a record of the total in the totalizers, is fed from a supply roll 122, freely mounted upon a stud 123, projecting from the printer frame 67, around guide rollers 124 and on to a receiving roll 125.

Simultaneously with the making of an impression upon the receipt strip, platen 134 will come into contact with the type on the top of the total printing wheels 120 and cause an impression of the same upon the record strip 121. The platen 134 is carried in an arm 135, pivoted on a stud 136, and is connected by a link 137 to a lever 138, pivoted on a stud 133 and connected to the arm 132 by a pin 139. The lever 138 is formed with a downwardly extending portion adapted to cooperate with a cam (not shown) fast on the driving shaft 89 and adapted to rock the lever 138 and thereby operate the platen block 130 and arm 135 at each operation of the driving shaft.

The impressions are rendered visible by utilizing the same ink ribbon 59 hereinbefore referred to.

After an amount accumulated on a totalizer has been recorded, it is desirable to return such totalizer to zero so that new transactions or totals of transactions may be entered in the totalizer. Mechanism is provided for returning either totalizer to zero without affecting the amount entered in the other totalizer. The shaft 192 extends through both the totalizer frames and has mounted thereon two groups of totalizer gears 42. Mounted on each of the totalizer gears 42 (Figs. 6, 7 and 8) are spring controlled pawls 205, which are adapted to engage with the walls of longitudinally extending grooves 206, formed in the shaft 192. There are also two groups of circumferentially extending grooves 207 formed in the shaft 192, into which the pawls 205 of either totalizer will project when the pawls of the other totalizer are in a position to engage with the grooves 206. The grooves 207 have inclined sides so that the shaft 192 may be moved longitudinally to bring the grooves 206 into alinement with the pawls 205. Referring to Figs. 6 and 8, the totalizer shaft 192 is in position to reset to zero position the gears 42 in the right hand totalizer when the total printing crank is operated. In the left hand totalizer (see Figs. 6 and 7) the pawls are resting in the circular grooves 207, in which position the gears 42 will not rotate when the shaft 192 is turned.

The mechanism connecting the total printing crank 85 (Fig. 11) with the totalizer resetting shaft is fully described in the Von Pein United States application and patent referred to, and will be but briefly described here.

The crank 85 is connected to the driving shaft 89 by the gears 87 and 88. The cams 100 and 101, fast to the driving shaft 89, operate the lever 102, which is connected by links 193 and 194 to a segment lever 195 secured to the shaft 306. This segment lever 195 meshes with a partial gear 196 pinned to the shaft 253 on the outside of the printer frame. Pinned to the shaft 253 on the other side of the printer frame is a segment 198 (Fig. 14) which meshes with a gear 199. Fast to this gear is a disk having a spring controlled pawl which engages with a ratchet fast to a gear 200 (Fig. 15), which meshes with a pinion 201, fast to the totalizer resetting shaft 192. The oscillating motion of the segment 198 will rotate the gear 199, together with the disk and pawl fast thereto, in a clockwise direction (Fig. 14). On this movement the pawl will slide over the teeth of the ratchet, but will not turn the gear 200. On the return movement of segment 198, however, the gear 200, gear 201 and shaft 192 will be rotated a complete revolution in order to return the selected totalizer to zero.

The return to zero shaft comprises a section journalled in the frame of the machine, a second section extending through the totalizers and therefore movable therewith to their position of rest, their item entering position and their total printing position, and a third section connected to said other sections by parallel pivots disposed in a direction permitting of the necessary movements of the second named section as the totalizer frame is actuated. The right hand connection involves a pin and elongated holes 208 (Fig. 6) to allow the section of the shaft cooperating with the totalizer wheels to have a longitudinal movement. This longitudinal movement is effected by means of the key 210, operatively connected to the arm 215 (Figs. 4 to 6) as hereinbefore set forth, the arm 215 having a bifurcated projection 216 embracing a collar 217, fast to the totalizer shaft 192.

The key 210 has two positions. When it is in its outward position, as shown in Fig. 6, the feelers 300 and grooves 206 toward the right hand end of the machine will be alined with their respective cooperating disks 45 and pawls 205 of the transaction totalizer and upon operation of the total printing crank the amount accumulated in this totalizer will be printed and the totalizer returned to zero. If it is desired to print the total in the grand totalizer and return the same to zero the key 210 is moved inwardly to position the feelers 300 and grooves 206 at the left hand end of the machine into cooperative relation respectively with the disks 45 and pawls 205. Sleeves 340 located between the left hand arms of the yokes of the grand totalizer transmit motion from the outside sleeve 301 and its yoke to the inner yokes and their sleeves and the inner yokes of the transaction totalizer as the outside sleeve is shifted to the right.

Mechanism is also provided for printing on the issuing receipt and record strips characters indicating the totalizer in which the amount printed had been accumulated. A type carrier 350 (Fig. 11) is provided with two sets of suitable characters, as letters A and B, arranged so that impressions may be taken therefrom simultaneously on both the record strip and the issuing receipt strip. The carrier is fast on a shaft 351 which is journaled in a cap fastened to the printer frame and in the side frame of the machine, and constitutes a support for the sleeves 257. Near its left hand end the shaft carries an arm 352 (Fig. 14) fast thereto and connected by a link 353 to an arm 354 rigid with the key 210, by means of which the type carrier will be set to print the character appropriate to the totalizer selected for printing.

While this invention is described in connection with totalizers referred to as transaction and grand totalizers, it is obvious that it is also applicable to a machine comprising a plurality of clerks' totalizers as in the Cleal patents referred to.

In resetting the totalizer wheels to zero position in a total printing operation, the trip cam 225 (Fig. 2), in passing from the "9" to the "0" place, will move the trip pawl 226 and disengage the shoulder 227 from the formed arm 228 on the carrying pawl 229. This would allow the carrying pawls to swing downward and engage with the ratchet wheels 330 of the totalizer wheels and move the wheels one space as the carrying pawl arms operate on the next registration of the machine, were not a device provided to hold the carrying pawls in their normal position during a total printing operation. This device consists of a shaft 230 journalled in the totalizer frame 41 and having fast thereto a group of arms 231, in alinement with a group of carrying pawls but normally held out of contact therewith by a spring 232. The arms 231, as the shaft 230 is rocked in a counter-clockwise direction, will assume a position with their upper ends under the carrying pawls 229 and hold them out of engagement with the ratchet wheels until the trip pawls 226 again assume their normal position.

The mechanism for rocking the arms 231 comprises a bell crank 233 fast to the right hand end of the shaft 230 (Figs. 1 and 2), with one arm 235 of the bell crank normally resting upon and projecting beyond a lug 234 of a bracket 236 fastened to the totalizer frame 41. A cam disk 237 mounted on the totalizer shaft 192 and caused to rotate with this shaft by having a pin 238 (Fig. 3) engaging with a groove 239 in the shaft will, as the shaft rotates in the direction of the arrow engage the projecting end of the arm 235 of the bell crank 233 and rock the shaft 230 to place the group of arms 231 (Fig. 2) in position to retain the carrying pawls 229 in an inoperative position.

The other arm of the bell crank 233 is provided with a laterally projecting ear 240 adapted to engage a forwardly extending arm of a second bell crank 241, pivoted upon a stud 242 mounted in the bracket 236. These bell cranks are connected by a spring 243 which, as the bell crank 233 is moved in a counter-clockwise direction, will cause the end of the bell crank 241 to rise to a position behind the ear 240 and retain the bell crank 233 in its operated position until the next registration is made by the keys 30. When the totalizer is rocked into engagement with the actuators, an upwardly extending arm 245 of the bell crank 241 contacts with an arm 162 of a yoke 160 and the bell crank 241 is thereby rocked in a counter-clockwise direction a sufficient distance to disengage the end of its forwardly projecting arm from the ear 240 and allow the spring 232 (Fig. 2) to return the shaft 230 and arms 231 to their normal position. A pin 247, projecting laterally from the bracket 236, limits the movement of the bell crank 241 when moving in a clockwise direction.

A formed ear 246 on the bracket 236 (Figs. 1 and 3), will hold the disk 237 in alinement with the bell crank 233 as the shaft 192 is shifted longitudinally.

Before the device for preventing a simultaneous operation of both the keys and the totalizing crank becomes effective, a slight downward movement of the key 30 (Fig. 1) will give a sufficient rotation to the shaft 145 to cause partial engagement of the totalizer pinions 146 with the actuators 40. The slide 115 (Fig. 11) not having entered the slot 118 it is possible to turn the totalizing crank 85 and cause damage to the mechanism. This condition is overcome by an improved device, which consists of a disk 147 (Figs. 6 and 14), fast to the shaft 145, an arm 148, freely mounted on the rod 74, and a disk 149, fast to the gear 110. The turning of the totalizing crank 85 causes the gear 110 to oscillate first in a clockwise direction and then in a counter-clockwise direction, by mechanism previously described. As the gear 110 moves in a clockwise direction, the angle edge 150 of the disk 149 will engage the projection 151 on the arm 148 and cause the arm to swing on its pivot, raising the end 152 into contact with the shoulder 153 on the disk 147.

Should a key 30 be slightly depressed previous to starting the totalizing crank, the shaft 145 would be turned slightly in a counter-clockwise direction and partially engage the totalizer with the actuator, as previously described. As the arm 148 is raised, the end 152 will contact with the shoulder 153 and force the shaft back to its normal position and disengage the totalizer from the actuator, thereby permitting the totalizing mechanism to function in its proper manner.

This retrograde movement of the shaft 145 is rendered possible by providing a portion of the ratchet wheel 327 in Fig. 17 with a plain edge 328 over which the spring pressed pawl 329 is inoperative to prevent retrograde movement of the item entering means and shaft 145.

An improved device for holding the totalizers out of engagement with the actuators when operating the total printing mechanism is a yoke 160 (Figs. 1, 6, 14, and 18 to 21), freely mounted upon a shaft 161, supported at each end in the frame of the machine. This yoke 160 has a forwardly extending arm 162 integral therewith and another arm 162 pivoted on the shaft 161 is connected to a yoke 185 secured to the yoke 160. These arms are provided with notches 163 (Fig. 1) adapted to engage with the shafts 44 of the totalizers, fully shown only in connection with the right hand totalizer and clearly shown in Fig. 19. At the right hand end of the yoke 160 (Figs. 6, 18 and 20) is a formed arm 164 extending outside of the frame of the machine. Projecting laterally from the arm is a stud 165, to which is connected a pitman 166 (Figs. 6, 14, 18 and 19) extending downwardly and having the lower end bifurcated to engage over the shaft 89 and be guided in its movement at the lower end by this shaft. Mounted on a stud carried by the pitman 166 is an antifriction roller 167, which cooperates with a groove 168, formed in the side of a disk 169, which is fast on the shaft 89 and makes one complete rotation at each operation of the totalizing crank. Immediately upon the starting of the totalizing crank 85, the yoke 160 (Figs. 1, 6 and 19 to 21) is rocked in a clockwise direction to hold the totalizer rigid while the feelers 300 are lowered into engagement with the stepped disks 45.

A spring pressed latch 170 (Figs. 1, 6, 18 and 20), mounted on a stud 171, supported in each of the arms 162 of the yoke 160, is also provided with a notch 163 to engage the shaft 44 in cooperation with the notch 163 in the arm 162. The notches 163 in the arm 162 (Fig. 21) and the latch 170 (Fig. 20) constitute in effect a single notch with a yieldable side wall 175. In a condition where a key 30 is slightly depressed before starting the totalizing crank, which condition has previously been described, and the totalizer is partially engaged with the actuators, the yoke 160, as it swings upwardly, will cause the side wall 175 on the latch 170 to contact with the shaft 44 and because of the flexible connection between the latch and the arm 162 the yoke 160 will be permitted to continue its movement, and as the arm 148 (Fig. 14) contacts with the shoulder 153 of the disk 147 and returns the shaft 145 to its normal position the totalizer frame 41 (Fig. 1) will be restored to its normal position, thereby aligning the shaft 44 with the slot 163. A spring 176, one end of which is attached to a pin 177 projecting laterally from the latch 170 and the other end fastened to a pin 178 projecting from the arm 162 will normally hold the latch 170 with the end 179 in contact with the pin 178.

An improved device, which positively stops the rotation of the stepped disks 45 when they reach their zero normal position during the total printing operation, is connected to the yoke 160 (Fig. 6) and through it is controlled by the cam 169 (Figs. 14, 18 and 19). Loosely mounted on the shaft 161 and connected to the yoke 160, is a yoke 185 having two groups of forwardly extending arms 186 (Figs. 6, 9 and 10) each group of arms cooperating with laterally extending projections 187 formed on the gears 43 (Figs. 6, 9 and 10) of one of the two totalizers which are partially shown here. In normal position, the arms 186 (Fig. 10) are out of the path of the projections 187, and permit rotation of the totalizing wheels.

Near the end of the total printing operation the cam 169 (Fig. 14) will swing the yoke 160 upwardly an additional distance, thereby elevating the arms 186 (Fig. 10) to a position where the projections will contact with the ends of the arms 186 and stop the rotation of the totalizer wheels in their normal position.

The pitman 166 (Figs. 6 and 14) has a formed ear 190, which, as the cam 169 raises the pitman and rocks the yoke 185 to position the arms 186 and stop the rotation of the stepped disks, will assume a position in the path of an arm 191, fast to the totalizer resetting shaft 192 and stop this shaft after it has made a complete rotation during the total printing operation.

In a machine of the class described the differential movement of a registering segment 40 for the keys of any group is obtained by spacing the slots of the differential arms 35 different distances from the cross rods 37 on said segment registering frame 38, the arms of the smaller denominational keys traveling through a greater distance before contacting with said cross rods than the keys of larger denomination. The momentum gathered by the key coupler near the end of its upward movement may, when abruptly transferred to the registering segments, be sufficient to cause an over-rotation of the rotatable elements of the totalizer.

The machine disclosed is provided with four sets or groups of keys each group cooperating with its respective segments of the two totalizers. Motion from the cents keys to their more remote segment and motion from the tens of dollars keys to both of their segments are transmitted by rod and pinion connections 161—262 and 261—263, respectively, disposed between a segment carried by the actuator frame and segments meshing with the rotatable elements, constructed substantially the same as shown in the Cleal patents hereinbefore referred to. The driven ends of the rods 161—261 lag behind the driving ends due to inertia of rest thereby setting up a torsional strain in the rods which, together with the momentum set up in the moving parts, may be sufficient to cause an over-rotation of the rotatable elements.

To reduce the force of the blow on certain of said segments and to prevent an over-rotation of the rotatable elements of the totalizer, means is provided for proportionately decreasing the rate of travel of certain of the differential arms 35 in the groups above referred to. This means consists of a differential motion reducing lever connection between the first four keys of the cents group and the three tens-of-dollars keys and their respective differential arms.

As shown in Figs. 1 and 16, the auxiliary or differential levers 260 are fulcrumed on rods 264—265 supported by the frame of the machine and by brackets 266 and 267 projecting from the frame cross bar 212.

The forward end of the lever 260 has a slot 268, which cooperates with the stud 269, projecting from the key 30, to rock the lever 260 on its fulcrum 264. The location of the stud 269 in relation to the slot 268 is the same for the first three keys. The stud 270 mounted in the fourth key bears a different relation to the slot 268 from that of the first three keys to give a greater movement to the lever 260. A stud 271 mounted in the rear part of the key 30 cooperates with a slot 272 formed in the auxiliary lever 260 to guide the lever during its operation. Where there is an auxiliary lever used in connection with a key 30 the differential arm 35 is attached to the lever 260 by having a laterally projecting stud 273 engaging an elongated opening 274 formed in the lower end of the differential arm 35. In this case the shoulder on the arm 35 is spaced farther from its point of attachment than in the case where it is directly attached to the item key.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, a totalizer involving rotatable elements and a turn-to-zero shaft, driving means for rotating said shaft, means for arresting said rotatable elements at zero, an element on said shaft, and means actuated by said driving means adapted to move into the path of the element for stopping said shaft at zero, said arresting means being actuated by the last-named means.

2. In a machine of the class described, the combination of two totalizers adapted to be restored to zero separately, means for entering data on either totalizer, a single rotating shaft for restoring either totalizer to zero, means for operating the shaft, and means for moving the rotating shaft laterally to position, to restore either totalizer to zero position.

3. In a machine of the class described, an item entering means, totalizing means mounted for movement into and out of engagement with said item entering means, an operating mechanism, and means under control of said operating mechanism for moving said totalizing means from a partially moved position to normal.

4. In a machine of the class described, movably mounted totalizing means, means for entering items therein involving a device for moving the totalizing means into operative relationship with the item entering means, an operating device, and mechanism controlled by said operating device and acting on the totalizer moving device to reversely operate it to shift said totalizing means from a partially moved position back to normal.

5. In a machine of the class described, movably mounted totalizing means, item entering means including a revolution shaft for moving said totalizing means into engagement with said item entering means, a projection on said shaft, an operating device, and means actuated by said device for cooperation with said projection to restore said totalizing means from a partially moved position to normal.

6. In a machine of the class described, in combination, item entering means, an operating means, and means driven from said operating means for restoring said item entering means from a partially operated position to normal.

7. In a machine of the class described involving item entering means, an operating means, mechanism for preventing a complete operation of said item entering means simultaneously with the operation of the operating means, and means under control of said operating means for restoring said item entering and the preventing mechanism from partially operated positions to normal.

8. In a machine of the class described, a movable totalizer having a restore-to-zero position, means for restoring said totalizer to zero, a projection on said totalizer, a notched means adapted to cooperate with said projection to hold said totalizer in position to be restored to zero, and an operating means for actuating said restoring and holding means, one arm of said notched means including a yieldable member.

9. In a machine of the class described, a movable totalizer having a restore-to-zero position, means for restoring said totalizer to zero, an operating device for actuating the restoring means, and holding means adapted to be brought into operative engagement with the totalizer by the operating means, said holding means involving a yieldable portion to permit movement thereof without destructive effect when the totalizer is out of a restore-to-zero position.

10. In a machine of the class described comprising a totalizer including transfer mechanism, means for entering items therein, means for restoring the totalizer to zero, means including a lever adapted to be actuated by said restoring means for rendering the transfer mechanism inoperative, and means adapted to move into the returning path of movement of said lever for locking said mechanism in its inoperative position.

11. In a machine of the class described comprising a totalizer including transfer mechanism, means for entering items therein, means for restoring the totalizer to zero, means including a member having a flange and adapted to be actuated by said restoring means for rendering the transfer mechanism inoperative, and means automatically operated to engage said flange to lock said last mentioned means in its actuated position.

12. In a machine of the class described, in combination, a totalizer involving carrying pawls, means for entering items therein, means for restoring said totalizer to zero, means actuated by said restoring means for moving said pawls into inoperative position, and means for locking said pawls in an inoperative position, said last mentioned means being moved into unlocking position by an operation of the item entering means.

13. In a machine of the class described, a movably mounted totalizer involving carrying pawls, means for entering items therein, means for restoring the totalizer to zero, means actuated by said restoring means for moving the carrying pawls into inoperative position, means for locking the carrying pawls in an inoperative position, and means for releasing said locking means as said totalizer is moved into item entering position.

14. In combination, a totalizer involving transfer pawls and a turn-to-zero shaft, means actuated by said shaft for moving said pawls into an inoperative position, and locking means releasable by the first means for holding said first means in an operated position.

15. In a machine of the class described, item entering means, a movably mounted totalizer involving transfer pawls, a return-to-zero shaft, and means actuated by the latter for moving said pawls into an inoperative position, means for locking said pawls in an inoperative position, means for holding said totalizer in a position to be restored to zero, and means actuated by the item entering means for moving said locking means into engagement with said holding means to effect a release of said transfer pawls.

16. In a machine of the class described, the combination of a totalizer having a printing position and mounted for bodily movement from and to its printing position, a printing mechanism involving type elements, and means for setting the type in accordance with the amounts in the totalizer, operating mechanism for the printing mechanism, and means actuated by the operating mechanism for positioning the totalizer for printing.

17. In a machine of the class described, the combination of a movably mounted totalizer, a recording mechanism involving recording elements and means for setting the recording elements in accordance with the amount in the totalizer, operating mechanism for the recording mechanism, and means under control of the operating mechanism for positioning and holding the totalizer for recording.

18. In a machine of the class described, a movably mounted totalizer, a recording mechanism involving recording elements and means adapted to cooperate with the totalizer when in normal position for setting said elements in accordance with the amount in the totalizer, operating mechanism for the recording mechanism, means actuated by the operating mechanism for moving the totalizer into normal position when slightly displaced from normal, and means including a plurality of notched members, one carried by the other and both actuated by said mechanism for holding the totalizer in normal position during operation of the recording means.

19. In a machine of the class described, the combination of a plurality of totalizers normally in recording position, a recording mechanism involving means to adjust the same in accordance with the amount in any of the totalizers, means for selecting the totalizer for recording, a turn-to-zero shaft shiftable for selecting any totalizer to be turned to zero and means for rotating the shaft to effect a restoration to zero of the selected totalizer.

20. In a machine of the class described, the combination of a plurality of totalizers, an item entering mechanism for simultaneously entering items in said totalizers, a recording mechanism involving means to adjust the same in accordance with the amount in any of the totalizers, means for selecting the totalizer for recording, means for separately restoring any totalizer to zero and means under control of said selecting means for determining which totalizer is to be restored to zero.

21. In a machine of the class described, the combination of a plurality of totalizers adapted to be restored to zero, a recording mechanism involving means to adjust the same in accordance with the amount in any totalizer, operating mechanism for the recording mechanism, means adapted to be adjusted to separately restore any totalizer to zero, said last mentioned means being actuated by the operating mechanism, and means for selecting the totalizer for recording and for controlling said adjustable restore-to-zero means.

22. In a machine of the class described, the combination of a plurality of totalizers, means for separately restoring any totalizer to zero, said means involving rigidly spaced restore-to-zero elements, a recording mechanism involving recording elements controlled by a set of rigidly spaced devices, said restoring elements and devices being rigidly connected together and movable laterally relatively to the totalizers, and means for effecting a movement between the restoring elements and devices, and the totalizers.

23. In a machine of the class described, the combination of a plurality of accumulators adapted to be restored to zero, zero resetting means therefor, and a depressible key to enable said zero resetting means to clear one of said accumulators when depressed and another of said accumulators when not depressed.

24. In a machine of the class described, the combination of a sub-total accumulator, a grand accumulator, a set of feeler fingers for each accumulator, printing devices including type carriers common to said sets of feelers for printing the total from either of said accumulators, means to separately reset any set of accumulators to zero, and a common operating mechanism for operating the resetting means and the feelers.

25. In a machine of the class described, the combination of a plurality of totalizers, means for separately restoring any totalizer to zero, said means involving rigidly spaced restore-to-zero elements, a recording mechanism involving recording elements controlled by rigidly spaced devices cooperating with the totalizer, said restoring means and controlling devices being rigidly connected together and movable relatively to the totalizers, and means for effecting a movement between the restoring means and controlling devices, and the totalizers.

26. In a machine of the class described, the combination with a totalizer; and actuators therefor; of impression mechanism, type elements; and means to operate the impression mechanism; devices operable by the impression-operating means to set the type elements in accordance with the amount registered on the totalizer; said devices and the totalizer being mounted for relative bodily movement into and out of effective relation; and means controlled by said impression-operating means to relatively position the totalizer and said setting means for printing.

In testimony whereof I affix my signature.

EDWARD J. VON PEIN.